(No Model.)

F. G. W. J. ADAMS.
SHUTTER FOR SIGNALING.

No. 597,134. Patented Jan. 11, 1898.

Witnesses.
F. Nelson
Gust. Ehrlich

Inventor
Frederick George William James Adams
by L. K. Böhm
his attorney.

(No Model.)  2 Sheets—Sheet 2.

F. G. W. J. ADAMS.
SHUTTER FOR SIGNALING.

No. 597,134. Patented Jan. 11, 1898.

Witnesses.
F. Nelson.
Gust. Ehrlicher

Inventor:
Frederick George William James Adams
by L. K. Böhm
his attorney.

UNITED STATES PATENT OFFICE.

FREDERICK GEORGE WILLIAM JAMES ADAMS, OF LONDON, ENGLAND.

SHUTTER FOR SIGNALING.

SPECIFICATION forming part of Letters Patent No. 597,134, dated January 11, 1898.

Application filed March 18, 1897. Serial No. 628,135. (No model.) Patented in England December 10, 1892, No. 22,726.

*To all whom it may concern:*

Be it known that I, FREDERICK GEORGE WILLIAM JAMES ADAMS, a subject of the Queen of England, residing at Greenwich, London, in Kent county, England, have invented certain new and useful Improvements in or Relating to Shutters for Signaling and other Purposes, (for which I have obtained a patent in England, No. 22,726, dated December 10, 1892,) of which the following is a specification.

My invention relates to an improved form of shutter for signaling and other purposes.

The improved shutter comprises a base of metal or other suitable material having an aperture over which works a shutter of any required shape constructed in two parts or pieces. The shutter travels on spindles by means of nuts which are either fixed to or cast on the shutter, each spindle for a portion of its length being cut with a right-hand and for a similar portion with a left-hand screw-thread. The shape, pitch, and number of the threads will vary under the different conditions of size, use, speed, and the like. The screwed spindles work and revolve in bearings carried by arms or projections affixed to or cast on the base. The complete shutter works in guides which are cut out of or cast in or affixed to either base or arm, as may be convenient. The movement of the one part of the shutter causes the spindle to revolve and operates the other half.

The invention is intended for use in any kind of signaling by light during foggy weather or at night.

Figure 1:
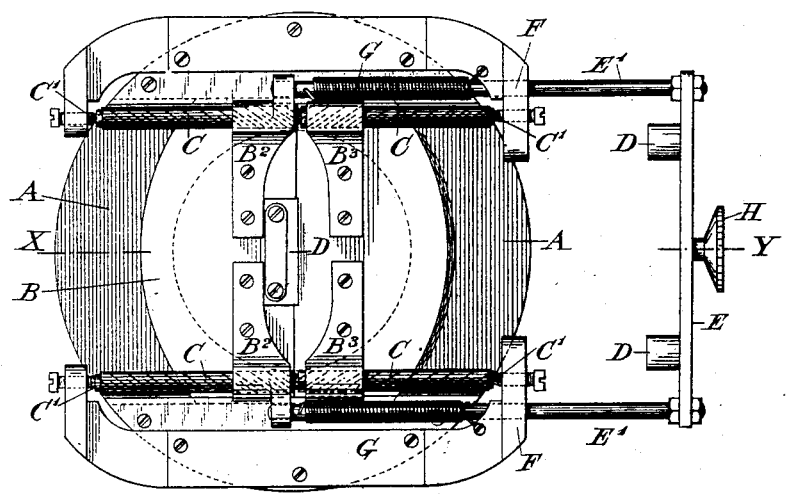
Figure 2:
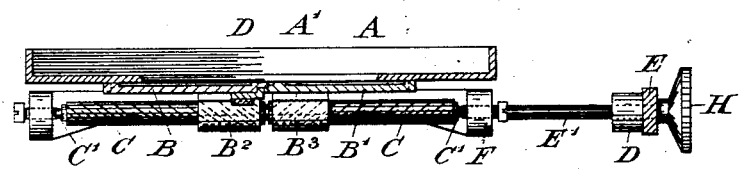
Figure 3:
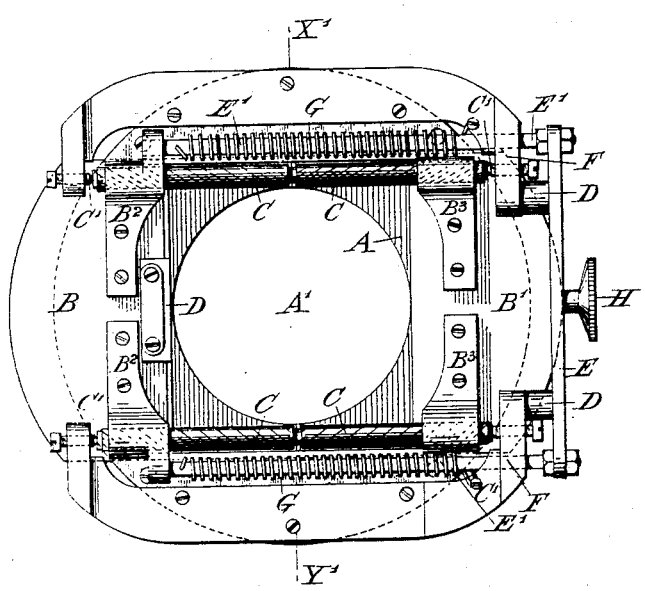
Figure 4:
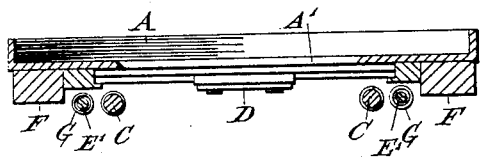

In the accompanying drawings, Figure 1 is an elevation showing the signaling-shutter closed. Fig. 2 is a section on the line X Y of Fig. 1. Fig. 3 is an elevation showing the shutter open. Fig. 4 is a section on the line X' Y' of Fig. 3.

A base of metal or other suitable material A has an aperture A', over which work the two parts B B' of the shutter. These two parts work by means of the nuts $B^2$ $B^3$ upon spindles C. The nuts $B^2$ $B^3$ are affixed to the two halves of the shutter, as shown, and the pitch of the screw-threads on the spindles C is so adjusted that the latter may be employed to actuate the shutter through the nuts, or the nuts by being passed along the spindles can be made to cause them to rotate reciprocally. The nuts are of course formed to correspond therewith.

The spindles C revolve between the centers C' and serve as guides for the two halves B B' of the shutter in opening and closing, in addition to which supplementary guides may be added to assist this guiding action in case it is desirable to have additional control.

To prevent the moving parts of the shutter from coming into violent contact with the base or with one another, buffers D, of rubber or other suitable material, are provided at points where such violent contact would otherwise occur.

Motion is imparted to the shutter by means of a frame which comprises a cross-head E and two rods E'. These rods are attached to the more distant end of the shutter and the frame works clear of the nearer half. The rods E' work through lugs F, attached to the base A and serve to afford points of attachment for two springs G, by means of which the shutter is automatically returned to its closed position, or any other suitable device may be used for this purpose. The frame is fitted with a thumb-piece H for receiving the pressure of the operator's hand in opening the shutter. The action of these parts is as follows: By means of pressure applied to the thumb-piece H the shutters B B' are forced open, the pressure being transmitted by the rods E' direct to the more distant half of the shutter. The motion of the nuts $B^2$, attached to this half over the spindle C, causes the latter to rotate and by their rotation to produce in the other half of the shutter through the nuts $B^3$ a motion equal and opposite to that of the half already considered, thus causing the shutter to open and uncover the aperture A'. Upon removal of the opening pressure the springs G reverse these motions and cause the shutters to close.

The action of the shutters is very rapid and very easily reversible and is therefore peculiarly well adapted to the purpose of signaling by means of light.

I claim—
1. A signaling device consisting of a base A with aperture A', a shutter made in two parts with nuts $B^2$, $B^3$ traveling on reversely-screw-threaded spindles C, a frame with thumb-piece H, cross-head E and rods E' in lugs F which are attached to the base A, substantially as described and for the purpose specified.

2. In a signaling device the combination of base A with aperture A' with shutters B, B', having nuts $B^2$, $B^3$, reversely-screw-threaded spindles C and a frame composed of cross-head E, thumb-piece H and rods E' in lugs F and springs G on the rods E', substantially as described.

In witness whereof I have hereto set my hand in the presence of the two subscribing witnesses.

FREDERICK GEORGE WILLIAM JAMES ADAMS.

Witnesses:
WM. G. WILDE,
N. E. DELLAMY.